US009955322B2

(12) United States Patent
Matsushima

(10) Patent No.: US 9,955,322 B2
(45) Date of Patent: Apr. 24, 2018

(54) RELAYING DEVICE, AUDIO COMMUNICATION SYSTEM, AND RELAYING METHOD

(71) Applicant: ICOM INCORPORATED, Osaka (JP)

(72) Inventor: Hisaaki Matsushima, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 15/032,408

(22) PCT Filed: Oct. 31, 2014

(86) PCT No.: PCT/JP2014/079133
§ 371 (c)(1),
(2) Date: Apr. 27, 2016

(87) PCT Pub. No.: WO2015/068664
PCT Pub. Date: May 14, 2015

(65) Prior Publication Data
US 2016/0286365 A1   Sep. 29, 2016

(30) Foreign Application Priority Data

Nov. 7, 2013   (JP) ................................ 2013-231598

(51) Int. Cl.
*H04W 4/10* (2009.01)
*H04W 84/12* (2009.01)
(Continued)

(52) U.S. Cl.
CPC ........... *H04W 4/10* (2013.01); *H04L 12/4625* (2013.01); *H04W 16/18* (2013.01); *H04W 84/12* (2013.01); *H04W 88/04* (2013.01)

(58) Field of Classification Search
CPC ........ H04W 4/10; H04W 84/12; H04W 16/18
See application file for complete search history.

(56) References Cited

U.S. PATENT DOCUMENTS 5,422,944 A   6/1995   Sakai
6,970,926 B1  11/2005  Needham et al.
(Continued)

FOREIGN PATENT DOCUMENTS

CN   1604502 A   4/2005
JP   06-224833 A   8/1994
(Continued)

OTHER PUBLICATIONS

International Search Report of PCT/JP2014/079133.
Extended European Search Report for No. EP14860572 dated Apr. 12, 2017.

*Primary Examiner* — Muthuswamy Manoharan
(74) *Attorney, Agent, or Firm* — Muncy, Geissler, Olds & Lowe, P.C.

(57) ABSTRACT

[Problem] To provide an audio communication system in which a relaying device is connected to terminal devices via a communication network and said terminal devices communicate with each other on the basis of assignments for said terminal devices.
[Solution] This relaying device is provided with a network communication unit, a storage unit, and a control unit. The network communication unit is connected to a communication network and communicates with a plurality of terminal devices over said communication network. The storage device assigns each terminal device to one of a plurality of subsystems and stores, for each terminal device, the assigned subsystem and identifying information. When an audio signal is received from a given terminal device, the control unit identifies the subsystem to which said terminal device is assigned from originating-terminal-device information attached to the audio signal and forwards the audio signal to another terminal device assigned to the identified subsystem. The terminal devices transmit audio signals to the relaying device, each of said audio signals having (Continued)

forwarding-destination information that specifies the forwarding destination for said audio signal attached thereto.

9 Claims, 7 Drawing Sheets

(51) Int. Cl.
    *H04W 16/18*     (2009.01)
    *H04L 12/46*     (2006.01)
    *H04W 88/04*     (2009.01)

(56) References Cited

U.S. PATENT DOCUMENTS

| | | | | |
|---|---|---|---|---|
| 8,280,423 | B2* | 10/2012 | Siegel | H04W 4/06 |
| | | | | 455/518 |
| 8,613,029 | B2* | 12/2013 | Eguchi | H04L 12/4625 |
| | | | | 725/80 |
| 2005/0075121 | A1* | 4/2005 | Hasegawa | H04W 76/005 |
| | | | | 455/518 |
| 2009/0144406 | A1* | 6/2009 | Kojo | H04L 65/1066 |
| | | | | 709/223 |
| 2011/0103283 | A1 | 5/2011 | Kale | |

FOREIGN PATENT DOCUMENTS

| | | |
|---|---|---|
| JP | 07-135490 A | 5/1995 |
| JP | 07-177246 A | 7/1995 |
| JP | 2007-134829 A | 5/2007 |
| JP | 2007-300286 A | 11/2007 |
| JP | 2010-109506 A | 5/2010 |
| JP | 2013-012793 A | 1/2013 |

* cited by examiner

| DESTINATION IP ADDRESS | SENDER IP ADDRESS | PAYLOAD | | | |
|---|---|---|---|---|---|
| | | AUDIO SIGNAL | PARTNER IDENTIFICATION NUMBER (SESSION NUMBER) | DIVIDED SYSTEM NUMBER | SOURCE TERMINAL NUMBER |

TERMINAL TABLE
                                                                    ┌301

| COMPREHENSIVE TERMINAL NUMBER | DIVIDED SYSTEM NUMBER | TERMINAL NUMBER | IP ADRESS | ACTIVE FLAG | CONFIGURATION DATA STORAGE ADDRESS |
|---|---|---|---|---|---|
| 1 | 101 | 1 | 192.168.0.100 | ○ | 001 |
| 2 | 102 | 1 | 192.168.0.101 | ○ | 002 |
| 3 | 101 | 2 | 192.168.0.102 | ○ | 003 |
| 4 | 102 | 2 | 192.168.0.103 | ○ | 004 |
| ⋮ | ⋮ | ⋮ | ⋮ | ⋮ | ⋮ |
| 199 | 101 | 100 | 192.168.0.XXX | ○ | 199 |
| 200 | 102 | 100 | 192.168.0.XXX | × | 200 |

GROUP TABLE 302A

| GROUP NUMBER | BELONGING TERMINAL |
|---|---|
| G1 | 1,2,3,4,5 |
| G2 | 6,7,8,9,10 |
| ⋮ | ⋮ |
| G20 | 96,97,98,99,100 |

GROUP TABLE 302B

| GROUP NUMBER | BELONGING TERMINAL |
|---|---|
| G1 | 1,2,3,4,5 |
| G2 | 6,7,8,9,10 |
| ⋮ | ⋮ |
| G20 | 96,97,98,99,100 |

FIG.5B

MIXIXNG TABLE 303A

| SESSION NUMBER | CALLING TERMINAL | EXTRA TERMINAL | EXCLUDED TERMINAL | PARTICIPATING TERMINAL | HOLDING TIME(TS) |
|---|---|---|---|---|---|
| G1 | 23 | 23 | 2 | 1,3,4,5,23 | 250 |
| 19 | 2 | – | – | 2,19 | 250 |

MIXIXNG TABLE 303B

| SESSION NUMBER | CALLING TERMINAL | EXTRA TERMINAL | EXCLUDED TERMINAL | PARTICIPATING TERMINAL | HOLDING TIME(TS) |
|---|---|---|---|---|---|
| A | 23 | - | 100 | 1,⋯,99 | 250 |

FIG.5C

RELAYING DEVICE, AUDIO COMMUNICATION SYSTEM, AND RELAYING METHOD

BACKGROUND OF THE INVENTION

Technical Field

The present invention relates to an audio communication system using a network such as a wireless LAN.

Background Art

As a device performing audio communication by radio, a so-called radio communication device is mainly used, which modulates a high frequency career as a continuous time signal to an analog signal or a digital signal and transmits it. The radio communication device performs basically one-on-one communication, however, the device having a group communication function by which a plurality of radio communication devices communicate at the same time is also provided.

Furthermore, as disclosed in Japanese Unexamined Patent Publication No. 2010-109506, a radio communication system (a wireless trunking system) consisting of a server, a repeater, the radio communication device and the like is also provided. In the system, each of the plural repeaters is driven to function as a relaying device for relaying the radio communication devices. Various configurations of the repeater can be performed in the server. Many radio communication devices can be used in the system.

PRIOR ART REFERENCE

Patent Literature

Patent Literature 1: Japanese Unexamined Patent Publication No. 2010-109506

BRIEF SUMMARY OF THE INVENTION

In the wireless trunking system explained above, it is hard to establish a plurality of virtual systems in a single system. For example, in a building where a plurality of companies are occupied, it is hoped that the communication system used the radio communication device is provided for each company. However, each company needs to introduce the system respectively because radio signal reaches to a different company if only one system above is used. On the other hand, it is thought that introducing cost of such a system is kept as low as possible.

The purpose of the present invention is to provide audio communication system and the relaying device therefor, which enables that the a plurality of virtual audio communication systems in an audio communication system are executed by connecting the relaying device with the terminal device as the communication device via a communication network and managing the communication between the terminal devices in the relaying device on the basis of belonging of the terminal device.

A relaying device of the present invention comprises a network communication unit, a storage unit and a control unit. The network communication unit is connected with a communication network and communicates with a plurality of terminal devices via the communication network. The storage unit makes each of the terminal devices belong to any of a plurality of divided systems and stores the belonging divided system of each terminal device and identifying information. The control unit determines the divided system to which a terminal device belongs from the terminal device information of the calling source attached to the audio signal when the audio signal is received from the terminal device and transfers it to another terminal device belonging to the determined divided system.

A program of the present invention drives the computer of the relaying device, comprising the network communication unit for communicating with a plurality of the terminal devices via network and the storage unit in which information of a plurality of the terminal devices is stored, to function as a registering means, a determining means of a divided system and a transferring means. The registering means makes each of the plural terminal devices belong to any of a plurality of the divided systems and registers a belonging divided system of each terminal device in the storage unit. The determining means of a divided system determines the divided system to which the terminal device belongs from the terminal device information of the calling source attached to the audio signal when the audio signal is received from a terminal device. The transferring means transfers it to another terminal device belonging to the calculated divided system.

A relaying method of the control unit of the relaying device for communicating with a plurality of the terminal devices via the communication network comprises a registering step, a determining step and a transferring step. The registering step makes each of the plural terminal devices belong to any of a plurality of the divided systems and registers a belonging divided system of each terminal device in the storage unit. The determining step makes each of the plural terminal devices belong to any of a plurality of the divided systems and registers a belonging divided system of each terminal device in the storage unit. The transferring step transmits it to another terminal device belonging to the calculated divided system.

In each invention above, the identifying information may be attached uniquely to each terminal device in each divided system and the terminal device information of the calling source may include the belonging divided system and the identifying information.

Furthermore, the identifying information may be attached uniquely to all of a plurality of the terminal devices and the terminal device information of the calling source may include the identifying information.

The communication network between the network communication unit and the terminal device includes a wireless local area network and the terminal device may be connected to the wireless local area network.

An audio communication system of the present invention comprises the terminal device having a terminal network communication unit and the relaying device having the network communication unit, the control unit and the storage unit and the terminal network communication unit of the terminal device and the network communication unit of the relaying device transmit and receive the audio signal via the communication network. The storage unit of the relaying device makes each of the plural terminal devices belong to any of a plurality of divided systems and stores the belonging divided system of each terminal device and identifying information. The terminal device transmits the audio signal to which its identifying information is attached to the relaying device using the network communication unit of the terminal device. The control unit of the relaying device determines the divided system to which a terminal device belongs from the identifying information attached to the audio signal when the audio signal is received from the terminal device and transfers the received audio signal to another terminal device belonging to the determined divided system.

The terminal device may further comprise a push-to-talk (PTT) circuit and the terminal network communication unit may transmit the audio signal input from the microphone to the relaying device while the push-to-talk circuit is in ON status and receives the audio signal transmitted from the relaying device regardless of that the push-to-talk circuit is in ON/OFF status.

The network comprises a plurality of the access points for the wireless local area network, and the terminal network communication unit of the terminal device may connect to the network via any one of the access points.

According to the present invention, it will be possible that a plurality of virtual audio communication systems are executed in a single audio communication system by connecting a relaying device with a terminal device which is a communication device via a communication network and managing the communication between the terminal devices in the relaying device on the basis of belonging of the terminal device.

BRIEF DESCRIPTION OF DRAWINGS

FIG. 5B shows a group table which is provided in the server.

FIG. 5C shows a mixing table which is provided in the server.

DETAILED DESCRIPTION OF THE EMBODIMENT

Figure 1:
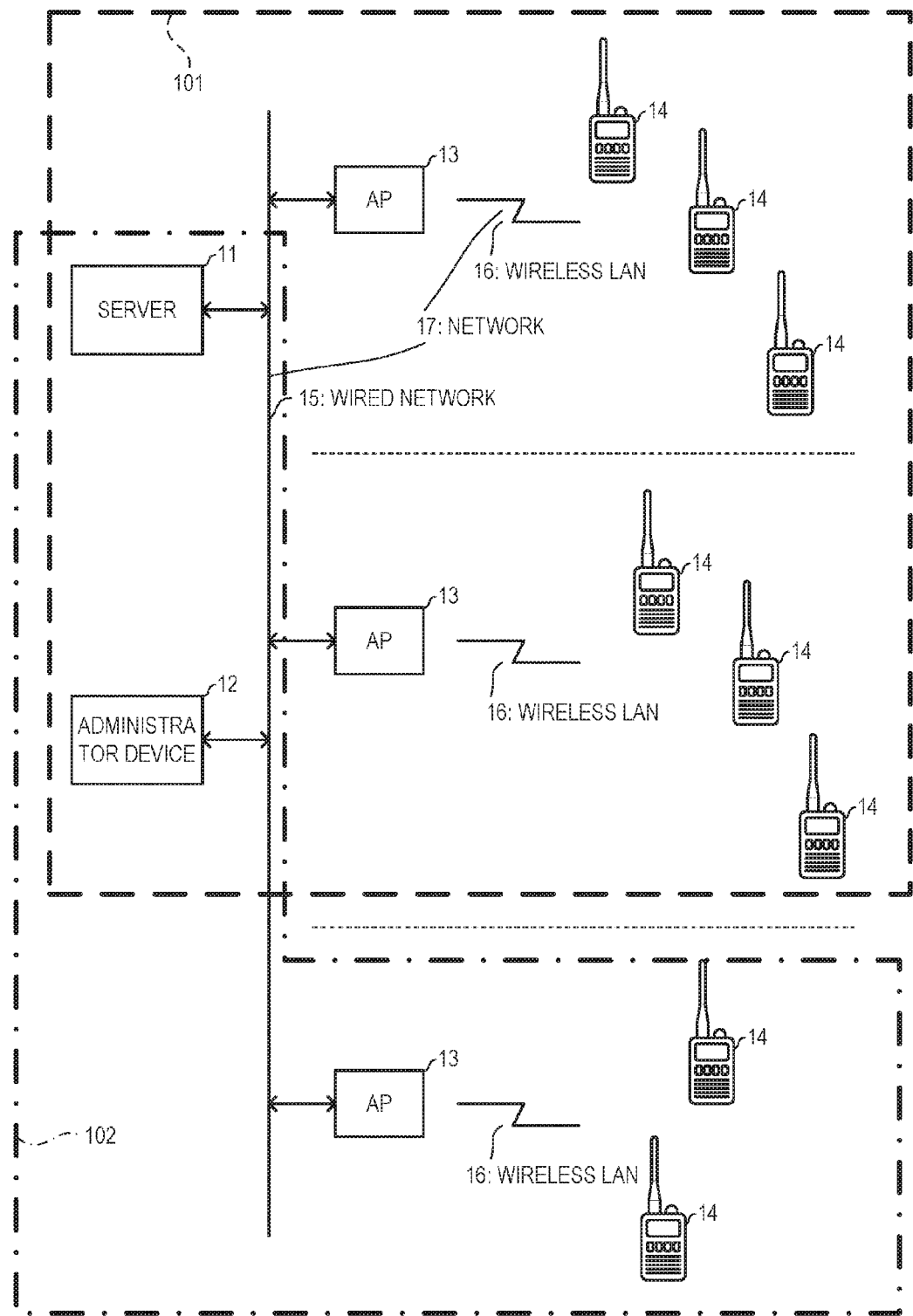
FIG. 1 shows a configuration of a communication system according to the embodiment of the present invention.
Figures 2, 3:
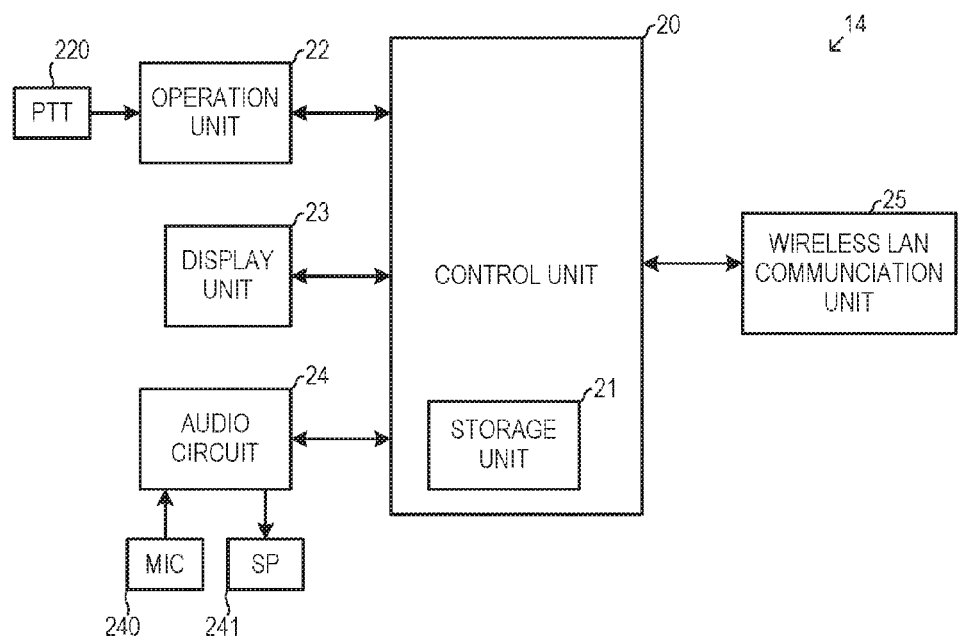
FIG. 2 is a block diagram of a transceiver which is a terminal device.
FIG. 3 shows an example of a constitution of a voice packet.

Referring to the figures, an audio communication system, which is the embodiment of the present invention, will be explained. FIG. 1 shows a configuration of a communication system according to the embodiment of the present invention. In the audio communication system, a plurality of terminal devices 14 communicate mutually, using a wireless LAN 16 such as Wi-Fi. The shape of the terminal device 14 is similar to a handy transceiver for radio communication, which has a push-to-talk (Push to Talk: PTT) switch 220 as shown in FIG. 2. In terms of functions, the terminal device 14 is a wireless network device which transmits and receives the voice packet via a wireless access point (AP) 13. The server 11, which is the relaying device, relays the mutual communication via a wired network 15 of a plurality of the terminal devices 14 or a wireless Local Area Network (LAN) 16. Hereinafter, the wired network 15 and the wireless LAN16 are collectively referred to as a network 17.

The server 11 establishes a plurality of (two in the embodiment) divided audio communication system 101, 102 in the audio communication system. The server 11 divides a plurality of the terminal devices 14 into a plurality of (two) collectivities and acts virtually as a different server to each collectivity, that is, it controls transmitting so as not to leak an audio signal between the divided audio communication system 101 and 102 and drives the system 101, 102 function as each independent audio communication system practically. Each of the terminal devices belonging to the divided audio communication system 101, 102 is possible to communicate with only the terminal device 14 belonging to the same divided system. The audio communication system can be applied preferably for a building wherein a plurality of companies are or a shopping mall wherein a plurality of companies or shops are. For example, the audio communication system is provided in a building wherein Company A and Company B are, the divided audio communication system 101 is set up on a Company A's floor and the divided audio communication system 102 is set up on a Company B's floor. Thus, it is possible to establish the dedicated audio communication system for the Company A or B (the divided audio communication system 101, 102) and the mutual communication between the terminal devices 14 which are limited in each company becomes possible.

The terminal device 14 can perform individual communication, group communication and plenary communication (a plenary calling) in the belonging divided audio communication system 101, 102. The individual communication performs one-on-one communication designating a communication partner (another terminal device 14). The group communication performs communication with the terminal device 14 which belongs to the prepared group. The plenary communication performs communication with all terminal devices 14 capable of communication which are connected to the network 17 within a range of the divided audio communication system 101 or 102. The user can select the desired communication form from these by operating his or her terminal device 14.

The terminal device 14 is connected to the network 17 on start-up. The server 11 transmits the configuration data to the terminal device 14 and sets up the terminal device 14 for a communicable state when the terminal device 14 is connected to the network 17. The configuration data transmitted from the server is, for example, each number of the divided audio communication system 101 or 102 to which the terminal device 14 belongs (a divided system number), a terminal number with which the terminal device 14 can communicate, an updating program and the like.

Ethernet (registered trademark) LAN, the Internet and the like can be used as a wired network 15. Secure communication is available by using Virtual Private Network (VPN) when the wired network 15 includes the Internet. A communication system based on IEEE802.11 such as Wi-Fi can be applied as wireless LAN 16. The terminal device 14 communicates with the wireless access point 13 via the communication system of the wireless LAN 16.

A plurality of the wireless access points 13 are installed. Each wireless access point 13 is installed respectively, for example, on a different floor or in a different room of a building. Thus, it is possible to estimate the floor or the room where the terminal device stays, depending on which communication areas of the wireless access points 13 the terminal device 14 is belonging to. In this case, it is preferable that each of the divided audio communication system 101, 102 uses a different wireless access point 13 in a different floor or room respectively, however, the wireless access points 13 on the floor or in the room may be shared.

An administrator device 12 is connected to the wired network 15. The administrator device 12 consists of a personal computer in which a management program is installed, which accesses to the server device 11 in response to the operation by the administrator and provides the tables shown in FIG. 5A, 5B in the server device 11. Specifically, the administrator device 12 accesses to the server 11 in response to the operation by the administrator and provides the divided system number and the terminal number of each terminal device 14 of the terminal table 301 shown in FIG. 5A. Thus, the divided audio communication systems are established as many as the provided divided system numbers. Furthermore, the administrator device 12 is driven function as a terminal device and can communicate with another terminal device 14.

FIG. 2 is a block diagram of the terminal device 14. As mentioned above, in terms of functions, the terminal device 14 is a wireless network device which transmits and receives a voice packet via the wireless access point (AP) 13 of the wireless LAN. A control unit 20 controls an operation of the terminal device 14, which consists of a microprocessor. The control unit 20 has a storage unit 21 in which various data is stored. The configuration data which is downloaded from the server 11 is stored in the storage unit 21. An operation unit 22, a display unit 23, an audio circuit 24 and a wireless LAN communication unit 25 are connected to the control unit 20. The operation unit 22 includes key switches such as the PTT switch 220 receiving the user's operation, and inputs the operation signal to the control unit 20. The display unit 23 includes a liquid-crystal display, which shows an identification number of the communication partner whom the user's operation selects, the identification number of the called communication partner and the like.

The audio circuit 24 has a microphone 240 and a speaker 241. The control unit 20 decodes the received voice packet and inputs it in the audio circuit 24. The audio circuit 24 converts the decoded digital audio signal to the analog audio signal and outputs it from the speaker 241. The audio circuit 24 also converts the analog audio signal input by the microphone 240 to the digital audio signal and inputs it into the control unit 20. The control unit 20 packetizes the digital audio signal to the voice packet and inputs it into the wireless LAN communication 25. The wireless LAN communication 25 has a circuit which performs wireless communication by the communication method complying with IEEE802.11. The wireless LAN communication 25 transmits the packet input by the control unit 20 to the wireless access point 13 and inputs the received packets from the wireless access point 13 in the control unit 20.

When the user emits a voice to the microphone 240 with pressing the PTT switch 220, the terminal device 14 converts the voice (audio) signal to the voice packet and transmits it to the server 11. The voice packets has a constitution as shown in FIG. 3. A header of the voice packet includes a destination address and a sender address. A payload includes a transferred terminal number, a divided system number and a source terminal number along with the digitalized audio signal. The transferred terminal number is the identifying number of the communication partner (a target device). The identifying number of the communication partner is the terminal number (in the individual communication), the group number (in the group communication), or the plenary communication number (in the plenary communication). The final destination of the audio signal is the terminal device of the communication partner, although the address of the voice packet transmitted from the terminal device 14 is the server 11. The server 11 determines to what divided audio communication system 101, 102 the source terminal device 14 belong and transfers the audio signal of the voice packet to the terminal device 14 of the communication partner belonging to the same divided audio communication system 101, 102 when the server 11 receives the voice packet. Details are as follows. In case that the identifying number of the communication partner is the terminal number (in the individual communication), the audio signal is transferred to the terminal device 14 which belongs to the same divided audio communication system 101, 102 and is identified by the terminal number. In case that the identifying number of the communication partner is the group number (in the group communication), the audio signal is transferred to a plurality of the terminal devices 14 which belong to the group identified by the group number provided in the same divided audio communication system 101,102. Moreover, the identifying number of the communication partner is the plenary number (in the plenary communication), the audio signal is transferred to all the terminal devices 14 which can communicate in the same divided audio communication system 101, 102.

So as to transfer the audio signal, a new voice packet which contains the IP address of the transferred terminal device 14 as the destination address and the IP address of the server 11 as the sender address is generated. The transferred terminal number or the divided system number included in the payload of the new packet is same as the voice packet which the server 11 received. The source terminal number may be cleared, or the same of the voice packet which the server 11 received may be attached.

To summarize the above process, the terminal device 14 transmits the voice packet containing the audio signal input from the microphone 240 and the attached partner ID number, without performing the procedures for establishing communication such as a SIP procedure, when the PTT switch 220 is turned on. The server 11 transfers the audio signal to the communication partner identified by the partner ID number. Thus, by the audio communication system of the embodiment, the user can start communication almost at the same time of turning on the PTT switch 220, and can perform communication with sense of use like using the conventional radio communication transceiver due to starting the communication by transmitting the voice packet (RTP packet). For the sense of use, the server 11 performs the management of the IP address, the group and the like of each terminal device 14 and the transfer of the audio signal.

The terminal device 14 has a VOX circuit along with the PTT switch 220. The VOX circuit is the circuit that determines whether a speech voice (the audio signal) is input on the basis of the input level of the microphone 240 and the duration time, and makes the terminal device switch to the transmitting state (PTT switch is turned on), when it is determined that the speech voice is input. The terminal device 14 may switch transmitting on/off using the VOX circuit, instead of the PTT switch 220 or with PTT switch 220. A general radio communication transceiver has a simplex system which cannot receive a radio signal during transmitting. On the other hand, the terminal device 14 can transmit and receive the voice packet simultaneously because the audio signal is transmitted and received by the voice packet communication via the wireless LAN 16. The terminal device 14 can communicate by a full-duplex method which transmits and receives the audio signal simultaneously. Not to keep transmitting a silent voice packet, even when it performs the full-duplex communication, the terminal device 14 edits and transmits the voice packet by the PTT switch 220 or the VOX function only in case that the speech voice is input.

The server 11 transfers the audio signal contained in the voice packet received from the terminal device via the network 17, to the terminal device 14 of the communication partner via the network 17. In the group communication, the audio signal is transferred to a plurality of the terminal devices 14 which belong to the group, and in the group communication or the plenary communication, it may occur that a plurality of the users emit voices at the same time and the audio signals are transmitted from a plurality of the terminal devices 14 simultaneously. In this case, the server 11 edits a new audio signal mixing the audio signals, makes the voice packet containing the mixed new audio signal, and transfers it to each of the terminal devices 14. Note that the mixing by the server 11 is performed individually for each terminal device 14 belonging the group, and the audio signal transmitted by the device itself is not made to be included and returned in the mixed audio signal. That is, the audio signal mixed all received audio signals are transferred to the terminal device 14 which does not transmit the audio signal, and the audio signal mixed the received audio signals other than that transmitted by the terminal device 14 is transferred to the terminal device 14 transmitted the audio signal. Thus, echoes of the audio signal transmitted by the terminal device 14 itself are prevented from occurring in the terminal device 14.

Figures 4, 5A:
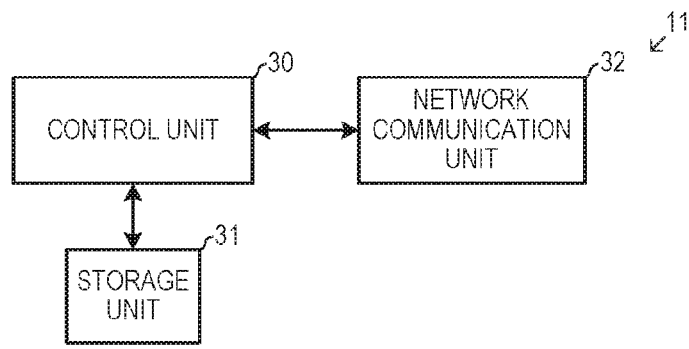
FIG. 4 is a block diagram of a server.
FIG. 5A shows a terminal table which is provided in the server.

FIG. 4 is a block diagram of the server 11, which has a control unit 30, a storage unit 31 and a network communication unit 32. The storage unit 31, for example, consists of a hard disc, RAM and the like, and stores tables shown in FIG. 5, the configuration data of each terminal device and the like. The control unit 30 performs setting up the terminal device 14, mixing the audio signal and the like. The network communication unit 32 controls the communication with the wired network 15.

FIGS. 5A, 5B and 5C are diagrams showing tables provided in the storage unit 31 of the server 11.

FIG. 5A is a diagram showing a terminal table 301, which is a table for the server 11 managing the terminal device 14. Any of the terminal device 14 is identified by a comprehensive terminal number which is assigned respectively so as to be unique. The comprehensive terminal numbers are assigned uniquely to all the terminal devices 14 communicated with the server 11, that is, all the terminal devices 14 of the divided audio communication system 101, 102 controlled by the server 11. Each terminal device 14 is also identified by the divided system number and the terminal number. The divided system number is a number of the divided audio communication system 101, 102 to which the terminal device 14 belongs. The terminal number is a number assigned to each of the terminal device 14 uniquely in each of the divided audio communication system 101, 102. Therefore, as shown in the terminal table 301, there are the terminal devices having the same terminal number but the different divided audio communication system number 101 or 102.

An IP address, an active flag, and a storage address of the configuration data in each terminal number 14 are stored in the terminal table 301. The IP address is an address on the network 17 of the terminal device 14. The server 11 stores the IP address when accessed by the terminal device 14 (the resist request). The active flag shows that the terminal device 14 is connected to the network 17, is registered by the server 11 and has downloaded various data by accessing the server 11, that is, it is possible to perform radio communication by completing the resist. The active flag is set when the server 11 completes the resist of the terminal device 14. The configuration data is, for example, the updating data of the program (a firmware), its own group, an address book storing another group which is permitted to communicate and the like.

The server 11 performs the resist of the terminal device 14 communicating with it, when the terminal device 14 is connected to the network 17. Moreover, the server 11 updates the resist of the terminal device 14 communicating with the terminal device 14 at the appropriate timing thereafter. The appropriate timing thereafter means, for example, at regular time intervals or when the connected wireless access point 13 is switched.

The user operates the terminal device 14 and makes a candidate number of the communication partner display on a display unit 23, when the user selects the communication partner. The candidate number of the communication partner means the terminal number of the active terminal device 14 described above and the group number whose communication is permitted.

FIG. 5B shows group tables 302 (302A, 302B), which are the tables for the server 11 to manage the group. The group table 302A shows group information of the divided audio communication system 101. The group table 302B shows group information of the divided audio communication system 102. The group constitutions of the group table 302A and 302B are same in the embodiment, however, they may be different. Each group is identified by the identified number (the group number) which is put respectively so as to be unique. The group number and the terminal number of the terminal device 14 (a belonging terminal device) which belongs to the group are stored in the group table 302 for every group number. The terminal device 14 which belongs to the group may be one or more. The group registered in the group table 302 is corresponded with the prepared group in the embodiment. A terminal table 301 and the group table 302 are provided in the server 11 by the administrator device 12 operated by the administrator.

FIG. 5C shows mixing tables (session tables) 303 (303A, 303B). The mixing tables 303 have a plurality of lines, and each line stores information of a communication session (a session group). In the mixing table 303A, information of the communication session of the divided audio communication system 101 is stored. In the mixing table 303B, the communication session of the divided audio communication system 102 is stored. The communication session here is a state transferring the audio signals mutually among a plurality of the terminal devices 14 with the server 11 as the relaying device. In the mixing tables 303A and 303B, the server 11 manages the terminal device 14 participating in the communication session in each of the divided audio communication system 101, 102. When the audio signal (the voice packet) is received from the terminal device 14, the server 11 determined of which communication session the audio signal is by referring the mixing table 303A, 303B.

The communication session is proceeded, for example, in following procedures. The communication session is established, that is, the mixing table is provided when the first calling voice packet to establish the communication session is received from the terminal device 14. A speech voice (for few seconds, for example) is divided into a short voice packet (20 milliseconds in the embodiment), then transmitted and received. Furthermore, in the communication session, the speech voice replying to a speech voice is received from another terminal device. An interval between the speech voice and the replying speech voice (silent time) is approximately from 0 to few seconds. The holding time of the communication session is provided to more than the maximum value of the silent time in general communication. The procedure for the basic communication session above is common to all the communication forms of the individual communication, the group communication and the plenary communication, however, the procedure of providing the mixing table 303 is different by each communication form.

For each communication session established in the divided audio communication system, items such as a session number, a calling terminal number, a participating terminal number, an extra terminal number, an excluded terminal number and remaining holding time (T1) are provided in the mixing table 303A, 303B. Information about each line of the communication session of the mixing table 303A, 303B is generated by the control unit 30 in the server 11 in response to that the calling terminal device transmits the first voice packet (the calling voice packet) to the server device 11.

The session number is a number to identify the communication session. The calling terminal number is the terminal number of the terminal device 14 transmitting the first voice packet (the calling voice packet) of the communication session. The session number may be unique in each communication session, however, in the embodiment, the transferred terminal number which is contained in the calling voice packet is used. The communication session in which the terminal number (such as "19" in the mixing table 303A) is registered as the session number is the communication session of the individual communication (an individual communication session). The individual communication is the individual, one-on-one communication between the terminal devices 14. The communication session in which the group number (such as "G1" in the mixing table 303A) is registered as the session number is the communication session of the group communication (a group communication session). The group communication is the communication that a plurality of the terminal devices 14 (generally more than three) exchange the audio signals mutually. Furthermore, the communication session in which the plenary communication number (such as "A" in the mixing table 303B) is registered as the session number is the communication session of the plenary communication (an plenary communication session). The plenary communication is a communication form that the audio signal is transferred to all the active terminal devices 14 in the divided audio communication system 101 or 102.

The participating terminal number is a list of the terminal number of the terminal device 14 which participates in the communication session. When the voice packet is transmitted from the terminal device 14 whose terminal number is registered in the participating terminal number, the control unit 30 transfers the voice packet to another terminal device 14 whose terminal number is registered in the participating terminal number, therefore executes the mutual communication between the participating terminal devices.

In the case of the group communication session, the participating terminal number includes the terminal number of the calling terminal device and the terminal number of the terminal device 14 which belongs to the group designated by the communication partner. However, as the terminal device 14, which belongs to the group but is not active or which performs another individual communication session, cannot participate in the group session, the terminal numbers thereof are excluded from the participating terminal number (which are registered in a field of excluded terminal numbers). In case that the calling terminal device does not belong to the group, that is, the terminal device 14 calls a group other than its own belonging group, the terminal number thereof is also registered as the participating terminal number. The terminal number is registered simultaneously in a field of an extra terminal number as an extra terminal number registered temporarily as a member. That is, the calling terminal device is treated as the terminal device 14 participating in the communication session (the participating terminal device) as well as the terminal device belonging to the group, even if it does not belong to the group. This way of communication is called an extension group communication. Note that the fields of the extra terminal number and the excluded terminal number are not essential. It is possible to manage the table only by adding or excluding the terminal number to the field of the participating terminal number.

In the plenary communication session, the participating terminal number includes the terminal number of the calling terminal device and the terminal number of all the communicable terminal devices 14. The excluded terminal number is same as the group communication described above. The extra terminal number is not registered.

In the case of the individual communication session, the terminal number of the calling terminal device and the terminal device 14 of the communication partner as the participating terminal number are registered. The extra terminal number and the excluded terminal number is not registered because of one-on-one communication.

Holding time is the time the communication session is being kept without cancel with the state that the voice packet is not transmitted from the participating terminal device. The holding time of each communication session in the server 11 is set, for example, to 30 seconds. A holding timer (TS) of the mixing table 303 is the timer which counts a lapse of the holding time, when the voice packet is not transmitted. In the processing by the control unit 30 (referred in FIG. 7), the holding timer TS is counted down if the voice packet is not transmitted, and is reset to 30 seconds if the voice packet is transmitted. In the event the timer TS is up because the voice packet is not transmitted from the participating terminal device for 30 seconds, the communication session is canceled and information of the communication session is deleted from the mixing table 303.

In the embodiment above, in the group communication session, the calling terminal device is additionally registered in the item of the participating terminal device of the mixing table 303 other than the belonging terminal device, and even if it is the belonging terminal device, the terminal devices 14 which is not active and which performs another communication session are excluded. However, the terminal device 14 additionally registered in the item of the participating terminal device and the excluded terminal device 14 are not limited to these.

When a participating terminal device starts a communication session (an individual communication session) in the middle of another session (except for the individual communication session), it is excluded from the participating terminal device of the group communication session at that time, that is, the terminal number of the terminal device 14 is shifted from the field of the participating terminal number to the field of the excluded terminal number.

To continue the communication session, it is also necessary that the holding time is counted in each terminal device 14. The holding time (T1) of the terminal device 14 is shorter than that of the server 11 (TS=30 seconds). 5 seconds is set in the timer T1, for example. The user can start another communication session by predetermined operation from when 5 seconds elapse after turning off the PTT switch 220, even if the communication session is maintained in the server 11.

It may also divide the mixing table 303 into 2 tables, an executing mixing table and a saving table. The executing mixing table is a table for registering the session executing mixing, and generated on a high-speed memory. The session in which the communication (transmitting and receiving the voice packet) stops is transcribed into the saving table in a short time of about 200 milliseconds, and kept only during the holding time (T1) in the saving table. When the communication (transmitting and receiving the voice packet) occurs again during the holding time, the session is transcribe again into the performing mixing table, and used for performing mixing. Thus, it becomes possible to release rapidly each terminal device from the mixing table 303.

Figure 6:
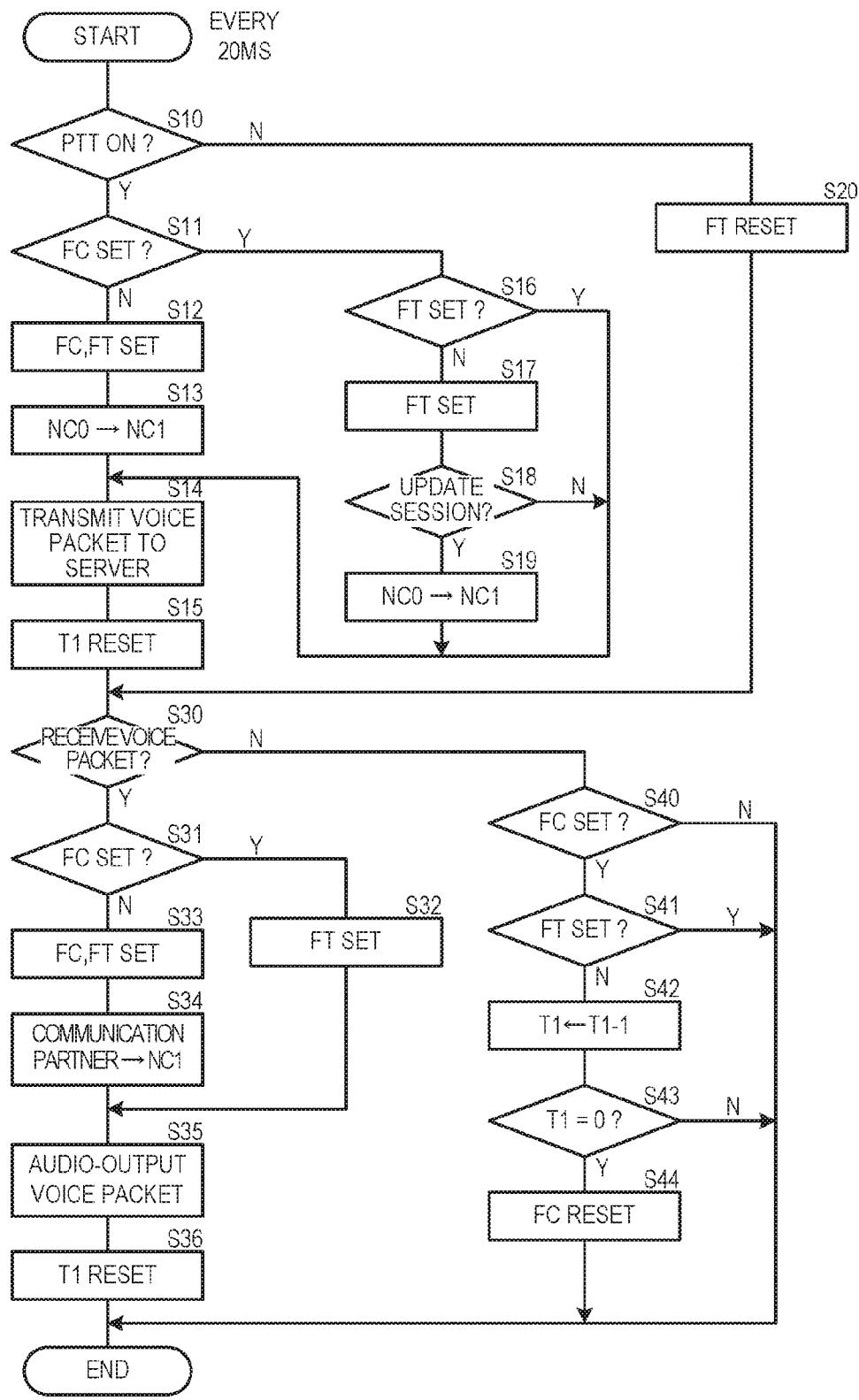
FIG. 6 is a process flowchart of a transceiver.

FIG. 6 is a flow chart showing communication control processing performed by the control unit 20 of the terminal device 14. The processing is performed repeatedly every 20 milliseconds. Current communication state is determined in response to turning on/off of the PTT switch 22 or receiving the voice packet (RTP packet). The kinds of flags or timers used in the flow chart are as follows.

PTT: It is the abbreviation of the Push-To-Talk switch (PTT switch) 220, which is not limited that the PTT switch 220 is turned on/off. It is also included that the transmission signal by the VOX circuit is on/off.

NC0: The identification number (the terminal number/the group number/the plenary number) of the communication partner selected by the operation of the user.

NC1: The session number, the identification number which identifies the performing communication session, and the identification number (the terminal number/the group number/the plenary number) of the communication partner which is contained in the first voice packet establishing the communication session are used.

FC: A communication session flag (the flag showing that the terminal device 14 participates in the communication session)

FT: A communicating flag (the flag showing that the voice packet is being transmitted or being received)

T1: A holding timer (the timer counting the holding time (5 seconds) of the communication session)

S10-S20 are management processing for transmitting the voice packet. The control unit 20 determines the state of the PTT switch 220 (S10), which proceeds the processing to S11 in case that PTT switch 220 is being turned on, and proceeds the processing to S12 in case that the PTT switch is being turned off. In the description of the flowchart, turning on the PTT switch comprises turning on the transmitting function by VOX.

In S11, the control unit 20 determines whether the communication session flag FC is set or not. When the communication session flag FC is not set (No in S11), the voice packet which is generated by the PTT switch 220 being turned on this time is the calling voice packet. The control unit 20 sets the communication session flag FC and the communicating flag FT showing that the voice packet is being transmitted and received (S12) The control unit 20 transcribes the communication partner number NC0 selected by the user into the communication session number NC1 (S13), and then transmits the voice packet containing the communication session number NC1 and the divided system number along with the audio signal in the payload to the server 11 (S14). By the transmission of the calling voice packet, the communication session is started by the server 11. The control unit 20 proceeds the management processing of receiving the voice packet in S30 and following steps after resetting the holding timer T1 to 5 seconds (S15).

In case that the communication session flag FC has already been set in S11 (Yes in S11), the control unit 20 determines whether the communicating flag FT is set or not, that is, the voice packet is being transmitted or received (S16). When the communicating flag FT is not set (No in S16), the control unit 20 sets the communicating flag FT (S17). In case that a new voice packet (talking voice of the user) is started transmitting with the state in which the communication session already started is maintained, the processing is proceeded from S11 to S16, and then to S17. In S18, the control unit 20 determines whether to maintain the now existing communication session (No in S18), or to establish another new communication session leaving from the existing communication session (Yes in S18). It meant that the control unit 20 determines whether to reply to the existing communication session with the voice packet (No in S18), or to send the voice packet to a new communication partner of the new communication session (Yes in S18). It may be determined, for example, according to whether the operation by the user just before turning on the PTT switch 220 this time, such as the selection operation of the communication partner, is performed or not. When the user performed the selection operation of a new communication partner, it may be performed that the processing to establish the new communication session to the selected communication partner in S19.

In the case of updating the communication session (YES in S18), the control unit 20 transcribes the communication partner number NC0 selected then into the communication session number NC1 (S19) and proceeds the processing to S14. In the case of continuing the communication session already started (No in S18), the control unit 20 proceeds the processing from S18 to S14 directly.

When the PTT switch 220 is not turned on in S10 (No in S10), the control unit 20 resets the communicating flag FT (S20). In addition, in case that the communicating flag FT has already been reset, it is kept as it is. Thereafter, the control unit 20 proceeds the management processing for receiving the voice packet in S30 or below.

The control unit 20 determines whether the voice packet is received via the network 17 or not in S30, which proceeds the processing to S31, when the voice packet is received, and proceeds the processing to S40, when the voice packet is not received.

In S31, the control unit 20 determines whether the communication session flag FC is set or not. When the communication flag FC is not set (No in S31), a new communication session is established this time, whose first voice packet is determined to be transmitted, and the communication session flag FC and the communicating flag FT are set (S33). The FT flag is the flag showing that the voice packet is being transmitted and received. The control unit 20 transcribes the communication partner number which is included in the voice packet into the communication session number NC1 (S34), outputs the voice packet to the audio circuit 24 (S35), and resets the holding timer T1 to 5 seconds.

In case that the communication session flag FC has already been set in S31 (Yes in S31), the control unit 20 sets the communicating flag FT in response to receiving the voice packet this time (S32). In addition, in case that the communicating flag FT has already been set, it is kept as it is. Thereafter, the control unit 20 proceeds the processing to S35.

When the voice packet is not received in S30 (No in S30), the control unit 20 determines whether the communication session flag FC is set or not (S40). In case that the communication session flag FC is set (Yes in S40), the control unit performs the processing in S41 and following steps. When the communication session flag FC is not set (No in S40), the control unit 20 finishes the processing without more steps.

In S41, the control unit 20 determines whether the communicating flag FT is set or not. When the communicating flag FT is set (Yes in S41), the control unit 20 finishes the processing without more steps. When the communicating flag FT is not set (No in S41), that is, in the state that the communication session flag FC is set though the communicating flag FT is reset, the control unit 20 subtracts 1 count (which corresponds to 20 milliseconds) from the holding timer T1 (S42), and determines whether the holding timer T1 becomes 0 or not by the subtraction (S43). When the holding timer T1 becomes 0 (Yes in S43), the control unit 20 resets the communication session flag to cancel the communication session (S44). In S3, when it is still greater than 0 in the holding timer T1 (No in S43), the control unit 20 finishes the processing without more steps.

Figure 7A:
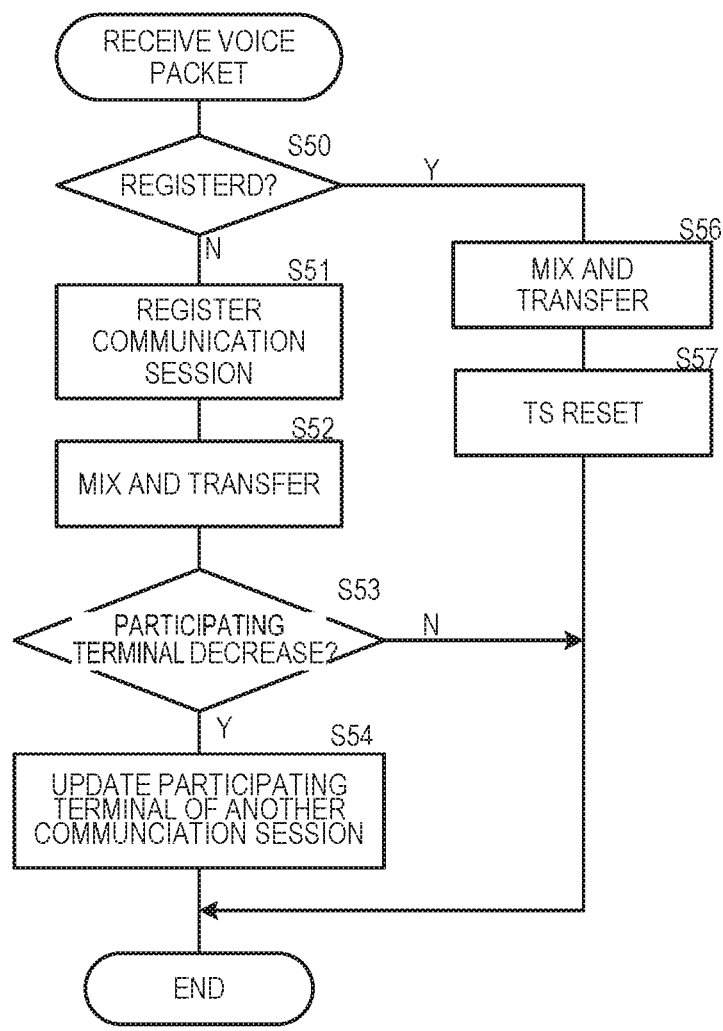
FIG. 7A is a process flowchart of the server.
Figure 7B:
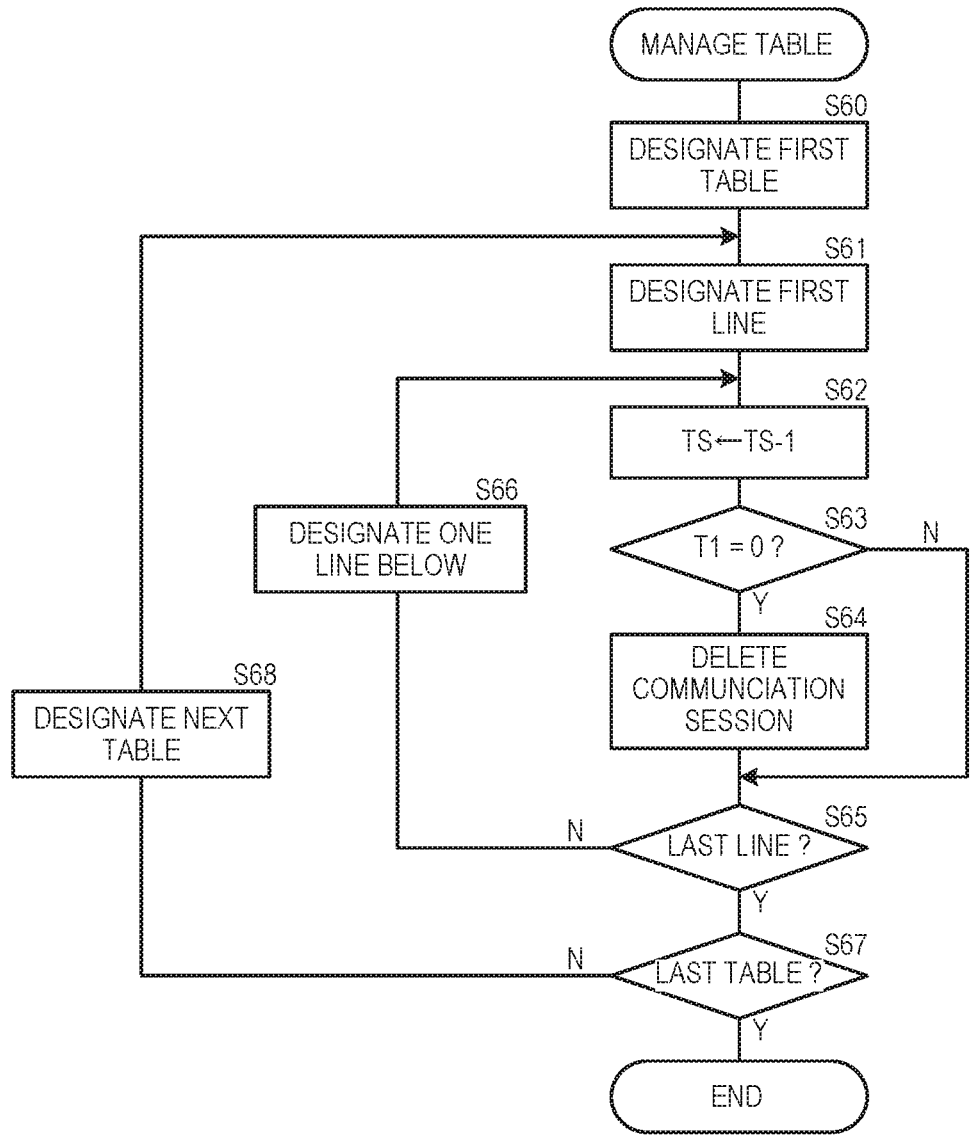
FIG. 7B is a process flowchart of the server.

FIGS. 7A and 7B are flow charts showing the action of the server 11. FIG. 7A shows the processing during receiving the voice packet, and FIG. 7B shows the mixing table control processing.

In FIG. 7A, the control unit 30 determines if the communication session identified by a calling source terminal number, an identification number of the communication partner, or the divided system number has already registered in the mixing table 303A or 303B (S50), when the voice packet is received. In case that the communication session has already registered in the mixing table 303 (YES in S50), the control unit 30 transfers the audio signal included in the received voice packet to the terminal device 14 which participates in the communication session on the basis of the participating terminal number of the mixing table 303A or 303B (S56), and resets the holding timer TS of the communication session in the mixing table 303A or 303B to 30 seconds (S57).

When the received communication session of the voice packet is not registered in the mixing table 303A or 303B (No in S50), that is, when the voice packet is the calling voice packet, a new communication session based on this calling voice packet is registered in the mixing table 303A or 303B (S51), and at the same time, the communication partner number is registered as the session number and the terminal number of the terminal device 14 transmitting the voice packet is registered as the calling terminal number. As the participating terminal number, the communicating partner number and the calling terminal number is registered in case of the individual communication session, and the calling terminal number and the terminal number of the terminal device 14 which belongs to the group of the communication partner number is registered in case of the group communication session. The calling terminal number is also registered as the extra terminal number, when the calling terminal device does not belong to the group. Furthermore, when any of the terminal device 14, which belongs to the group, is non-active or cannot participate in the communication session such as participating another communication session, the terminal number is excluded from the item of the participating terminal number and transcribed into the item of the excluded terminal number.

Then, the control unit 30 transfers the received voice packet to the terminal device 14 participating to the communication session on the basis of the participating terminal number of the mixing table 303A or 303B (S52).

The control unit 30 determines if there is any terminal device 14 which is excluded from the participating terminal device of another communication session already registered because it participates the communication session which is established in S51 (S53). That is, it is necessary to leave from the communication session which is established beforehand in case that the terminal device 14 participating in the communication session which is established beforehand participates in the communication session which is newly established. When there is any appropriate terminal device 14 (Yes in S53), the terminal number of the terminal device 14 is deleted from the participating terminal number of the another communication session established beforehand (S54). The excluded terminal number is transcribed into the excluded terminal number. Thus the participating terminal device of each communication session is optimized.

The management processing of the mixing table in FIG. 7B is performed periodically and repeatedly (for each 20 milliseconds, for example). At first, the control unit 30 selects the first table 303A of a plurality of the mixing tables 303A, 303B (S60), and then designates the communication session in the first line of the mixing table 303A (S61). The control unit 30 subtracts 1 count (for 20 milliseconds) from the holding timer TS of the designated communication session (S62), and determines whether the holding timer TS becomes 0 or not by the subtraction (S63). When the holding timer TS becomes 0 (Yes in S63), the control unit 30 deletes the communication session of the line as the communication session is finished (S64). On the other hand, when the holding timer TS does not reach 0 (NO in S63), the control unit 30 proceeds the processing to S65.

The control unit 30 performs the processing above in order until the last line of the mixing table 303A (S65, S66), and further performs the processing above in order until the last table of the mixing table 303 (the mixing group 303B) is finished (S67, 68). Thus, the control unit 30 manages each of the mixing table 303A, 303B.

As described above, the audio communication system of the embodiment connects the relaying device (the server 11) with the terminal device 14 via the communication network 17, makes the server 11 as the relaying device manage the communication between the terminal devices 14 on the basis of the position of the terminal devices 14, and confines the destination of the voice packet to each divided audio communication system. Thus, it will be possible that a plurality of the divided audio communication systems are driven to function independently in a single audio communication system. Therefore, in the case of establishing a plurality of the audio systems, there is no need to introduce an equivalent number of the server 11 and it can suppress to increase the introducing cost of the system.

In the embodiment, two divided audio communication systems in the single audio communication system are generated, however, it is not limited to two. Furthermore, it is possible to increase or decrease numbers of the divided audio communication systems in response to change the configuration of the terminal table 301, the group table 302 and the mixing table 303 of the server by the administrator operating the administrator device 12. It is also possible to change belonging of the divided audio communication system 101, 102 of the terminal device 14 in response to change the divided system number to which the terminal device 14 belongs in the terminal table 301 by the administrator operating the administrator device 12.

In the embodiment, the divided system number to which the calling source terminal device 14 is attached to the voice packet, however, it may not be attached. For example, the comprehensive terminal number is contained in the voice packet as the source terminal number at first, and then the server 11 received the voice packet may search the calling source terminal number (the comprehensive terminal number) in the terminal table 301 and identify the divided system number to which the calling source terminal device 14 belongs and the terminal number of its divided audio communication system 101 or 102. In this case, the server 11 does not need to inform the divided system number to the terminal device 14.

Moreover, in the embodiment, the individual communication, the group communication and the plenary communication can be proceeded, however, it is not limited to those communication forms. The present invention can be applied in case that the individual communication can only proceeded.

In the embodiment, a non-active terminal device is excluded from the communication session as the excluded terminal device, however, the terminal device may be made to participate in the communication session when it becomes active.

In the embodiment, the communication session is established in response to the calling voice packet transmitted from the terminal device 14, however, a trigger for establishing the communication session is not limited to this. For example, the administrator may establish and cancel the mixing group by operating the mixing table 30 from the administrator device 12. Furthermore, the administrator device 12 may establish and cancel the extension group communication among the groups mentioned above. It is possible to manage totally and modify flexibly the mixing group in the way.

REFERENCE NUMERALS

11 server (Relaying device)
12 management device
13 wireless access point
14 terminal device
20 control unit (of the terminal device)
30 control unit (of the server)
32 network communication unit
101, 102 divided audio communication system
220 Push-To-Talk (PTT) switch
301 terminal table
302 (302A, 302B) group table
303 (303A, 303B) mixing table

What is claimed is:

1. A relaying device comprising:
a network communication unit for being connected with a communication network and communicating with a plurality of terminal devices via the communication network;
a storage unit for storing information of the terminal devices; and
a control unit for controlling audio signal communications between the terminal devices, wherein
the control unit sets a plurality of divided systems and makes each of the terminal devices belong to any one of the divided systems,
the plurality of divided systems are commonly controlled by the control unit but do not mutually exchange the audio signal communications with each other,
the control unit uses first identifying information to identify each of the terminal devices, the first identifying information being assigned uniquely to each of the terminal devices in each of the divided systems and being assigned commonly to a terminal device in another divided system,
each of the divided systems is configured with a group to which two or more of the terminal devices belong,
the control unit uses second identifying information to identify each group, the second identifying information being assigned uniquely to the group in each of the divided systems and being assigned commonly to a group in another divided system,
the storage unit stores a terminal table, in which a belonging divided system of each of the terminal devices and the first identifying information of each of the terminal devices in the belonging divided system are described, and a group table, in which each of the divided systems and in which the second identifying information of the group of the belonging divided system and the terminal devices belonging to the group are described,
when an audio signal is received from a calling source terminal device, which is one of the terminal devices, the control unit
determines one of the divided systems, to which the terminal device belongs to, based on calling source terminal device information attached to the received audio signal and the first identifying information, the one of the divided systems being defined as a determined divided system, and
searches the group table of the determined divided system based on the second identifying information to determine another terminal device belonging to the same group as the calling source terminal device, and
the audio signal is forwarded to the another terminal device.

2. The relaying device according to claim 1, wherein
the terminal table includes, as the first identifying information, terminal number attached uniquely to each terminal device in each divided system; and
the calling source terminal device information includes the belonging divided system and the terminal number.

3. The relaying device according to claim 2, wherein
as the first identifying information, the terminal table further includes a comprehensive terminal number attached uniquely to all of the terminal devices.

4. The relaying device according to claim 1, wherein
a communication network between the network communication unit and the terminal device comprise a wireless local area network; and
the terminal device is connected to the wireless local area network.

5. An audio communication system comprising:
a plurality of terminal devices having a terminal network communication unit; and
a relaying device having a network communication unit, a control unit and a storage unit; wherein
a terminal network communication unit of the terminal device and a network communication unit of the relaying device transmit and receive the audio signal via the communication network;
the control unit of the relaying device sets a plurality of divided systems and makes each of the terminal devices belong to any one of the divided systems, the plurality of divided systems being commonly controlled by the control unit but not mutually exchanging audio signal communications with each other, the control unit using first identifying information to identify each of the terminal devices, the first identifying information being assigned uniquely to each of the terminal devices in each of the divided systems and being assigned commonly to a terminal device in another divided system, each of the divided systems being configured with a group to which two or more of the terminal devices belong, the control unit using second identifying information to identity each group, the second identifying information being assigned uniquely to the group in each of the divided systems and being assigned commonly to a group in another divided system;

the storage unit of the relaying device stores a terminal table, in which a belonging divided system of each of the terminal devices and the first identifying information of each of the terminal devices in the belonging divided system are described, and a group table, which is provided for each of the divided systems and in which the second identifying information of the group of the belonging divided system and a terminal device belonging to the group are described;

the terminal device transmits the audio signal to which its calling source terminal device information is attached to the relaying device using the network communication unit of the terminal device; and the control unit of the relaying device
  determines the divided system to which a terminal device belongs from the calling source terminal device information attached to the audio signal based on the first identifying information when the audio signal is received from a calling source terminal device,
  determines another terminal device belonging to the same group as the calling source terminal device based on the second identifying information, and
  transfers the received audio signal to the determined another terminal device.

6. The audio communication system according to claim 5, further comprising:
a push-to-talk circuit; and wherein
  the terminal network communication unit transmits the audio signal input from the microphone to the relaying device while the push-to-talk circuit is being turned on and receives the audio signal transmitted from the relaying device regardless of that the push-to-talk circuit is turned on/off.

7. The communication network according to claim 5, wherein
  the network has a plurality of access points for the wireless local area network; and
  the terminal network communication unit of the terminal device connects to the network via any one of the access points.

8. A relaying method of a control unit of a relaying device for communicating with a plurality of terminal devices via a communication network, comprising:

a registering step that makes each of the terminal devices belong to any one the divided systems and any of a plurality of groups of a belonging divided system and registers the belonging divided system, group and first and second identifying information of each of the terminal devices in the storage unit;

a first determining step of a divided system that determines the divided system to which the terminal devices belongs from calling source terminal device information attached to the audio signal based on the first identifying information when the audio signal is received from a calling source terminal device, the plurality of divided systems being commonly controlled by a control unit but not mutually exchanging audio signal communications with each other;

a second determining step that determines another terminal device belonging to the same group in the determined divided system as the calling source terminal device based on the second identifying information, and a transferring step that transmits it to the determined another terminal device, wherein the control unit uses the first identifying information to identify each of the terminal devices, the first identifying information being assigned uniquely to each of the terminal devices in each of the divided systems and being assigned commonly to a terminal device in another divided system, each of the divided systems is configured with a group to which two or more of the terminal devices belong, the control unit uses the second identifying information to identify each group, the second identifying information being assigned uniquely to the group in each of the divided systems and being assigned commonly to a group in another divided system, and the storage unit stores a terminal table, in which a belonging divided system of each of the terminal devices and the first identifying information of each of the terminal devices in the belonging divided system are described, and a group table, in which each of the divided systems and in which the second identifying information of the group of the belonging divided system and the terminal devices belonging to the group are described.

9. The relaying method according to claim 8, wherein
the first identifying information is attached uniquely to each terminal device in each divided system, and
the terminal device information of the calling source includes the belonging divided system and the first identifying information.

* * * * *